US008924106B2

United States Patent
Inuta et al.

(10) Patent No.: US 8,924,106 B2
(45) Date of Patent: Dec. 30, 2014

(54) CONTROL APPARATUS OF AUTOMATIC TRANSMISSION

(75) Inventors: Yukiyoshi Inuta, Isehara (JP); Aki Hayakawa, Sagamihara (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 750 days.

(21) Appl. No.: 13/047,296

(22) Filed: Mar. 14, 2011

(65) Prior Publication Data
US 2011/0231073 A1  Sep. 22, 2011

(30) Foreign Application Priority Data

Mar. 16, 2010 (JP) ................................. 2010-058647

(51) Int. Cl.
| G06F 7/00 | (2006.01) |
| G06F 17/00 | (2006.01) |
| G06F 19/00 | (2011.01) |
| F16H 61/06 | (2006.01) |
| F16H 61/14 | (2006.01) |
| F16H 59/38 | (2006.01) |
| F16H 59/46 | (2006.01) |
| F16H 61/00 | (2006.01) |
| F16H 59/36 | (2006.01) |

(52) U.S. Cl.
CPC ............ *F16H 61/061* (2013.01); *F16H 61/143* (2013.01); *F16H 2059/385* (2013.01); *F16H 2059/467* (2013.01); *F16H 2061/0087* (2013.01); *F16H 2059/366* (2013.01); *F16H 2059/465* (2013.01); *F16H 2061/146* (2013.01)
USPC .................. 701/58; 701/51; 701/55; 701/60; 701/64; 477/62; 477/63

(58) Field of Classification Search
USPC .......... 701/51, 55, 58, 59, 60, 64, 67; 475/65; 477/62, 63, 180; 74/731.1
See application file for complete search history.

(56) References Cited

U.S. PATENT DOCUMENTS

| 4,651,142 | A | * | 3/1987 | Klatt .............................. 340/453 |
| 4,784,007 | A | * | 11/1988 | Ishida et al. .................... 74/335 |
| 4,817,776 | A | * | 4/1989 | Tateno et al. ................... 477/78 |
| 4,858,499 | A |   | 8/1989 | Ito et al. |
| 5,029,087 | A | * | 7/1991 | Cowan et al. ................... 701/68 |
| 5,065,849 | A | * | 11/1991 | Kono et al. ..................... 477/86 |
| 5,168,463 | A | * | 12/1992 | Ikeda et al. ..................... 365/78 |
| 5,413,539 | A | * | 5/1995 | Leonard et al. ................. 475/63 |

(Continued)

FOREIGN PATENT DOCUMENTS

| EP | 0 750 139 A2 | 12/1996 |
| JP | 63-009771 A | 1/1988 |
| JP | 08-240261 A | 9/1996 |
| JP | 2001-343068 A | 12/2001 |

*Primary Examiner* — Khoi Tran
*Assistant Examiner* — Jaime Figueroa
(74) *Attorney, Agent, or Firm* — Foley & Lardner LLP

(57) ABSTRACT

A control apparatus for a vehicle includes an automatic transmission configured to attain a predetermined shift-stage by releasing an engaged friction-engagement element and by engaging a released friction-engagement element; a variation-start detecting section configured to detect that a parameter which varies with a progress of inertia phase has varied; a memorizing section configured to sequentially memorize a state of the vehicle; and a learning section configured to correct a control quantity for a next-time shift of the transmission on the basis of the state of vehicle memorized at a timing earlier by a given time interval than a timing when the variation-start detecting section detects that the parameter has varied.

7 Claims, 5 Drawing Sheets

(56) References Cited

U.S. PATENT DOCUMENTS

| | | | |
|---|---|---|---|
| 5,879,268 A | 3/1999 | Yasue et al. | |
| 6,259,983 B1* | 7/2001 | Tsutsui et al. | 701/51 |
| 6,482,126 B2 | 11/2002 | Kawaguchi | |
| 7,204,784 B2* | 4/2007 | Suzuki et al. | 477/20 |
| 2002/0013193 A1 | 1/2002 | Kawaguchi | |
| 2003/0163235 A1* | 8/2003 | Tokura et al. | 701/67 |
| 2005/0143217 A1* | 6/2005 | Suzuki et al. | 477/5 |
| 2005/0276114 A1* | 12/2005 | Tsunekazu et al. | 365/185.22 |
| 2006/0200277 A1* | 9/2006 | Yoshida et al. | 701/1 |
| 2007/0167284 A1 | 7/2007 | Steinhauser et al. | |
| 2008/0026910 A1* | 1/2008 | Honma et al. | 477/149 |
| 2008/0032861 A1* | 2/2008 | Maki et al. | 477/143 |
| 2008/0096721 A1* | 4/2008 | Honma et al. | 477/120 |
| 2009/0247344 A1* | 10/2009 | Kubo | 475/125 |
| 2009/0248263 A1* | 10/2009 | Kubo | 701/55 |
| 2009/0248265 A1* | 10/2009 | Tabata et al. | 701/59 |
| 2009/0271081 A1* | 10/2009 | Watanabe et al. | 701/60 |
| 2010/0056332 A1* | 3/2010 | Kobayashi et al. | 477/110 |
| 2010/0174449 A1* | 7/2010 | Kim | 701/35 |

* cited by examiner

FIG.4

(INITIAL-PRESSURE CORRECTION-
AMOUNT CALCULATION MAP)

|     | b1  | b2  | b3  | ... | bm  |
|-----|-----|-----|-----|-----|-----|
| a1  | C11 | C12 | C13 | ... | C1m |
| a2  | C21 | C22 | C23 | ... | C2m |
| a3  | C31 | C32 | C33 | ... | C3m |
| ⋮   | ⋮   | ⋮   | ⋮   | ⋱   | ⋮   |
| am  | Cm1 | Cm2 | Cm3 | ... | Cmm | a1 < am b1 < bm

C11 < C1m

C11 < Cm1

C1m < Cmm

Cm1 < Cmm

FIG.5

|                          | $TE_1$   | $TE_2$   | ...  | $TE_x$   |
|--------------------------|----------|----------|------|----------|
| 2-3, 2-1                 | $C_{xx}$ | $C_{xx}$ | ...  | $C_{xx}$ |
| 3-4, 3-2, 3-1, 4-2, 4-1  | $C_{xx}$ | $C_{xx}$ | ...  | $C_{xx}$ |

CONTROL APPARATUS OF AUTOMATIC TRANSMISSION

BACKGROUND OF THE INVENTION

The present invention relates to a control apparatus of an automatic transmission.

U.S. Pat. No. 4,858,499 (corresponding to Japanese Patent Application Publication No. 63-9771) discloses a previously-proposed control apparatus of automatic transmission. In this technique, a start of inertia phase is determined by detecting the variation of a parameter which starts to vary when the inertia phase starts. This is because the variation of the parameter such as a gear ratio (speed ratio) which varies during the inertia phase needs to be detected in order to reliably judge the start of inertia phase without an error judgment.

However, in the case that it is determined that the inertia phase has started on the basis of the variation of the parameter as mentioned above, the start of inertia phase is determined at a timing delayed from an actual start timing of inertia phase. That is, accurately, a timing when it is determined that the inertia phase has started is not the actual start timing of inertia phase. Hence, U.S. Pat. No. 6,482,126 (corresponding to Japanese Patent Application Publication No. 2001-343068) discloses a technique in which an initial pressure of lockup clutch is learned and controlled based on a slip amount indicated before the inertia phase is started.

SUMMARY OF THE INVENTION

However, in the technique in which a control quantity for next-time shift is learned and controlled based on a state indicated when it is determined that the inertia phase has just started, the determination (detection) timing of inertia-phase start deviates from the actual start timing of inertia phase. Hence, the state indicated when the start of inertia phase is detected is not identical with a state existing when the inertia phase actually starts, so that there is a problem that an accuracy of the learning control is reduced.

It is therefore an object of the present invention to provide a control apparatus for a vehicle, devised to properly correct a control quantity for next-time shift on the basis of a parameter information of current-time shift.

According to one aspect of the present invention, there is provided a control apparatus for a vehicle, comprising: an automatic transmission configured to attain a predetermined shift-stage by releasing an engaged friction-engagement element and by engaging a released friction-engagement element; a variation-start detecting section configured to detect that a parameter which varies with a progress of inertia phase has varied; a memorizing section configured to sequentially memorize a state of the vehicle; and a learning section configured to correct a control quantity for a next-time shift of the automatic transmission, on the basis of the state of vehicle memorized at a timing earlier by a given time interval than a timing when the variation-start detecting section detects that the parameter has varied.

According to another aspect of the present invention, there is provided a control apparatus for a vehicle, comprising: an automatic transmission configured to attain a predetermined shift-stage by releasing an engaged friction-engagement element and by engaging a released friction-engagement element; variation-start detecting means for detecting that a parameter which varies with a progress of inertia phase has varied; memorizing means for sequentially memorizing a state of the vehicle; and learning means for correcting a control quantity for a next-time shift of the automatic transmission, on the basis of the state of vehicle memorized at a timing earlier by a given time interval than a timing when the variation-start detecting means detects that the parameter has varied.

According to still another aspect of the present invention, there is provided a control method for a vehicle including an automatic transmission configured to attain a predetermined shift-stage by releasing an engaged friction-engagement element and by engaging a released friction-engagement element, the control method comprising: detecting that a parameter which varies with a progress of inertia phase has varied; memorizing a state of the vehicle in sequence; and correcting a control quantity for a next-time shift of the automatic transmission, on the basis of the vehicle state memorized at a timing earlier by a given time interval than a timing when it is detected that the parameter has varied.

The other objects and features of this invention will become understood from the following description with reference to the accompanying drawings.

BRIEF DESCRIPTION OF THE DRAWINGS

FIG. 4 is an initial-pressure correction-amount calculation map according to the first embodiment.

FIG. 5 is an initial-pressure correction-amount map according to the first embodiment.

DETAILED DESCRIPTION OF THE INVENTION

First Embodiment

Figure 1:
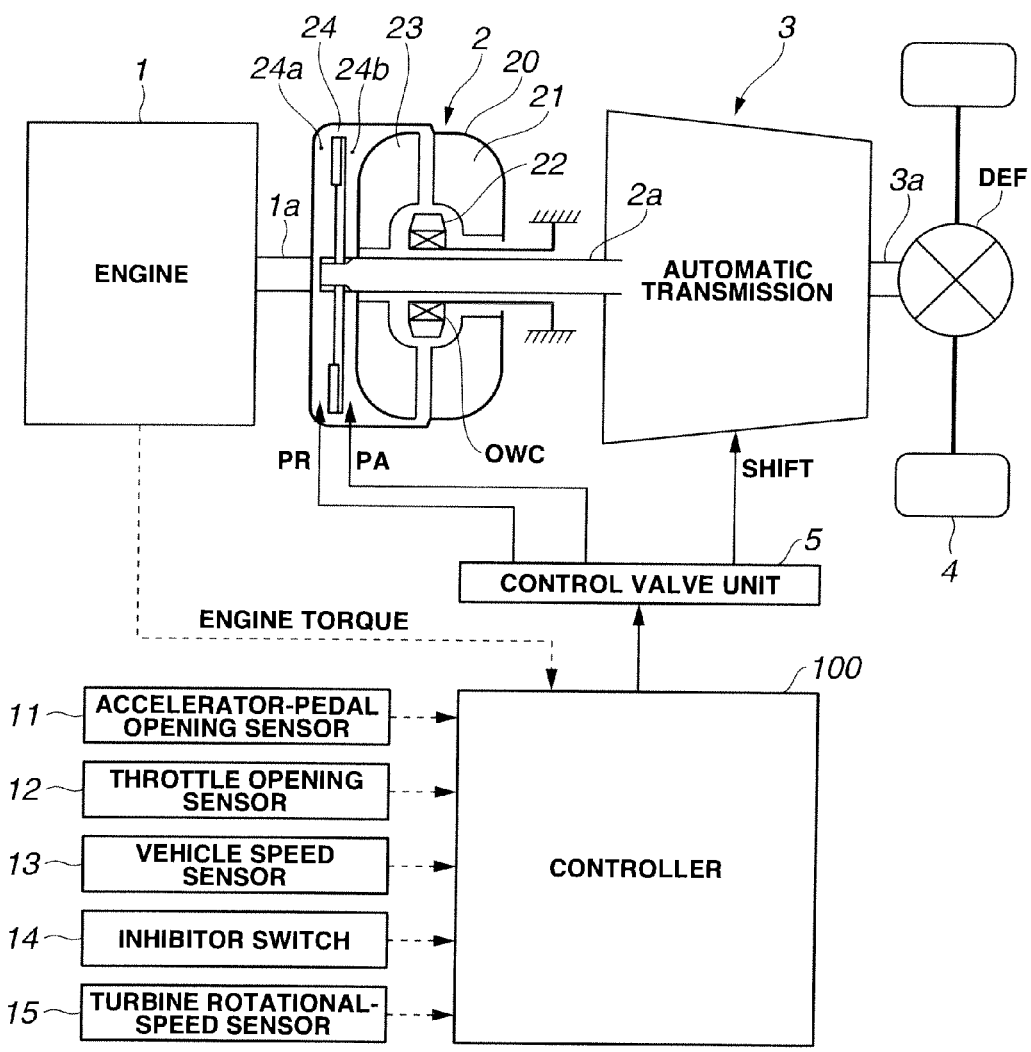
FIG. 1 is a schematic view showing a power train according to a first embodiment of the present invention.

FIG. 1 is a schematic view showing a power train according to a first embodiment of the present invention. An engine 1 serving as a drive source outputs driving force from an output shaft 1a of engine 1. The output shaft 1a of engine 1 is connected with a torque converter 2 which functions to amplify torque. A transmission input shaft 2a of the torque converter 2 is connected with an automatic transmission 3 for attaining a plurality of shift-stages (i.e., a plurality of designed gear stages of automatic transmission 3, e.g., a first-speed, a second-speed, and a third . . . ).

The torque converter 2 includes a pump impeller 21, a stator 22, a turbine runner 23 and a lockup clutch 24. The pump impeller 21 is welded to the inside of a converter cover 20 which rotates integrally with the output shaft 1a of engine 1. The stator 22 is fixed to and supported by a transmission case through a one-way clutch OWC. The turbine runner 23 rotates integrally with the transmission input shaft 2a. The lockup clutch 24 rotates integrally with the transmission input shaft 2a, and is fitted into the transmission input shaft 2a to allow the lockup clutch 24 to move in an axial direction of input shaft 2a.

The lockup clutch 24 includes a releasing-pressure chamber 24a and an applying-pressure chamber 24b. The releasing-pressure chamber 24a is provided on a forward (upstream) side of lockup clutch 24 in the axial direction, i.e., on a side of engine 1. The applying-pressure chamber 24b is provided on a backward (downstream) side of lockup clutch 24 in the axial direction, i.e., on a side of automatic transmission 3. The lockup clutch 24 is moved (in a stroke-movement manner) in the axial direction by a differential pressure between the releasing-pressure chamber 24a and the applying-pressure chamber 24b. According to the movement of lockup clutch 24, a friction force is generated between the lockup clutch 24 and the converter cover 20. Thereby, three states of a fully-engaged state (completely-lockup state), a slipping-engaged state and a fully-released state are achieved.

Under the fully-engaged state, the output shaft 1a of engine 1 is being directly connected with the transmission input shaft 2a so that driving force outputted from the engine 1 is directly inputted into the automatic transmission 3. Under the slipping-engaged state, driving force is transmitted through two routes. That is, in one of these two routes, driving force is transmitted from the turbine runner 23 to the transmission input shaft 2a by the torque-amplification function of torque converter 2. In another of the two routes, driving force is transmitted to the transmission input shaft 2a by a friction engaging force of the lockup clutch 24. Under the fully-released state, only the torque-amplification function of torque converter 2 is in operation so that all the driving force is transmitted from the turbine runner 23 to the transmission input shaft 2a.

The automatic transmission 3 is a step automatic transmission, i.e., an automatic transmission capable of achieving multiple shift-stages (multiple gear stages for speed change). The automatic transmission 3 is constructed to achieve the multiple shift-stages by engaging/releasing a plurality of friction engagement elements therein. When a given shift-stage is achieved, a first friction engagement element in the automatic transmission 3 is engaged and a second friction engagement element in the automatic transmission 3 is released. Then, when a shift command for changing the given shift-stage is outputted, the first friction engagement element is released and the second friction engagement element is engaged. Thus, a so-called changeover shift is carried out, and thereby, the plurality of shift-stages (e.g., first-speed, second-speed, and third . . . ) are achieved. Although the changeover between the first friction engagement element and the second friction engagement element is performed in the above explanation, a changeover between one or more first friction engagement elements and one or more second friction engagement elements may be performed according to the first embodiment of the present invention. Moreover, according to the first embodiment, the automatic transmission 3 has only to be constructed to achieve two or more shift-stages (gear stages). The driving force outputted from an output shaft 3a of the automatic transmission 3 drives drive wheels 4 through a differential mechanism DEF.

A control valve unit 5 for adjusting control pressures on the basis of command signals of a controller 100 is provided below the automatic transmission 3. The control valve unit 5 includes a plurality of pressure-regulator valves, shift valves, manual valves, engaging-pressure adjusting valves and the like. The control valve unit 5 functions to supply control pressures to necessary locations by appropriately adjusting the control pressures from a line pressure. More specifically, when a command to engage the lockup clutch 24 is outputted from the controller 100, a releasing pressure PR to be supplied to the releasing-pressure chamber 24a is reduced by the control valve unit 5, and also, an applying pressure PA to be supplied to the applying-pressure chamber 24b is increased by the control valve unit 5. Thereby, the lockup clutch 24 is engaged. Moreover, when the shift command is outputted from the controller 100, a hydraulic pressure (oil pressure) of the first friction engagement element in the automatic transmission 3 is reduced and a hydraulic pressure of the second friction engagement element in the automatic transmission 3 is increased by the control valve unit 5.

As shown in FIG. 1, the controller 100 receives an information derived from an accelerator-pedal opening sensor 11, a throttle opening sensor 12, a vehicle speed sensor 13, an inhibitor switch 14 and a turbine rotational-speed sensor 15, and an information of engine torque and engine rotational speed which are supplied from the side of engine 1. The accelerator-pedal opening sensor 11 serves to detect an accelerator-pedal opening which is a manipulated amount (operation quantity) of accelerator pedal by a driver. The throttle opening sensor 12 serves to detect a throttle opening of the engine 1. The vehicle speed sensor 13 serves to detect a vehicle speed by detecting a rotational speed of the output shaft 3a of automatic transmission 3. In detail, the vehicle speed sensor 13 calculates the vehicle speed by multiplying the detected rotational speed of output shaft 3a by a predetermined final reduction ratio and a tire radius. The inhibitor switch 14 serves to detect the position of a shift lever which is manipulated by the driver. The turbine rotational-speed sensor 15 serves to detect a rotational speed of the turbine runner 23. The controller 100 controls the engaged/released state of lockup clutch 24, a shift state of automatic transmission 3 and the like, on the basis of these inputted sensor signals. It is noted that (such an operation of) the controller 100 corresponds to a lockup-clutch control section or means according to the present invention.

In the case that a shift from a pre-shift shift-stage under fully-lockup state to a post-shift shift-stage under fully-lockup state is carried out; the automatic transmission 3 in the first embodiment becomes in slipping-lockup state from in its fully-lockup state, and conducts the shift, and then becomes in the fully-lockup state. Accordingly, a shift shock and the like are suppressed. The lockup clutch 24 does not need to slip at a start timing of inertia phase at which an actual shifting action is started. This is because an engine-idling feeling is caused to give a strangeness feeling to the driver if a slip amount of lockup clutch 24 is large at the start timing of inertia phase. On the other hand, it is preferable that the lockup clutch 24 has a certain level of slip amount at a finish timing of inertia phase. This is because an engine inertia torque generates a shift shock at the finish timing of inertia phase because of a delay of variation of engine rotational speed, if the slip amount of lockup clutch 24 is small at the finish timing of inertia phase.

Previously, in order to obtain a proper slip amount of lockup clutch at the start timing of inertia phase, a learning-correction control process has been performed. Specifically, by trying to detect an actual slip amount of lockup clutch at the start timing of inertia phase, a lockup-clutch initial pressure for a start time of lockup-clutch slip control has been learned based on the detected actual slip amount and has been controlled to its appropriate value. However, in the case that the initial pressure is learned and controlled based on the value which is given as a slip amount indicated at the start timing of inertia phase but in reality which is a slip amount already varied during the inertia phase, there has been a risk that an error learning occurs due to a difference of variation rate of turbine rotational speed during the inertia phase.

At first, in order to certainly detect the start of inertia phase without an error detection, for example, it is necessary to judge the start of inertia phase by detecting "change" of a parameter such as actual gear ratio (speed ratio of transmission) which varies after the start of inertia phase. Thus, in the case that the start of inertia phase is judged based on the "change" of parameter, an actual start timing of inertia phase is not directly detected. That is, in such a case, the start of inertia phase can be recognized (detected), for the first time, at a timing delayed from the actual start timing of inertia phase.

For example, in a case that a shifting time (i.e., time length secured for performing the shift) is set to be short by putting a priority on a shift response (speed-change response) because the throttle opening is high at the time of shift start, or in a case that the turbine rotational speed is high even on the condition of normal shifting time; the variation rate of turbine rotational speed is high during the inertia phase of shift. Meanwhile, the engine rotational speed during the inertia phase has a delay relative to the variation of turbine rotational speed. Hence, in such cases, even if the slip amount of lockup clutch at the actual start timing of inertia phase is equal to that of normal case, the slip amount of lockup clutch becomes different from that of the normal case in accordance with the variation rate of turbine rotational speed after the turbine rotational speed started to vary during the inertia phase.

Previously, it has not discovered that the slip amount at the timing of determination (detection) of inertia-phase start is an amount varied depending on the variation rate of turbine rotational speed (i.e., the slip amount at the timing of determination of inertia-phase start is a value already varied from its value existing at the timing of actual start of inertia phase in dependence upon the variation rate of turbine rotational speed). Hence, in a structure in which the initial pressure of lockup clutch is learned on the basis of the slip amount indicated at the time of determination of inertia phase, there has been the following problem. That is, in a case where the slip amount indicated at the timing of start determination of inertia phase has already increased from a slip amount existing at the timing of actual inertia-phase start due to a high variation rate of turbine rotational speed, the initial pressure is corrected to be increased even if the slip amount existing at the actual start timing of inertia phase is appropriate.

In consideration of the above-mentioned problem, in the first embodiment according to the present invention, the control quantity (controlled variable) for a next-time shift is corrected based on a vehicle state which is indicated at a time point earlier by a predetermined time interval than the time point when it is determined that the parameter (that has a property of varying during the inertia phase) has varied. Now, a lockup control process during shift and an initial-pressure correction control process will be explained.

(Lockup Control Process During Shift)

Figure 2:
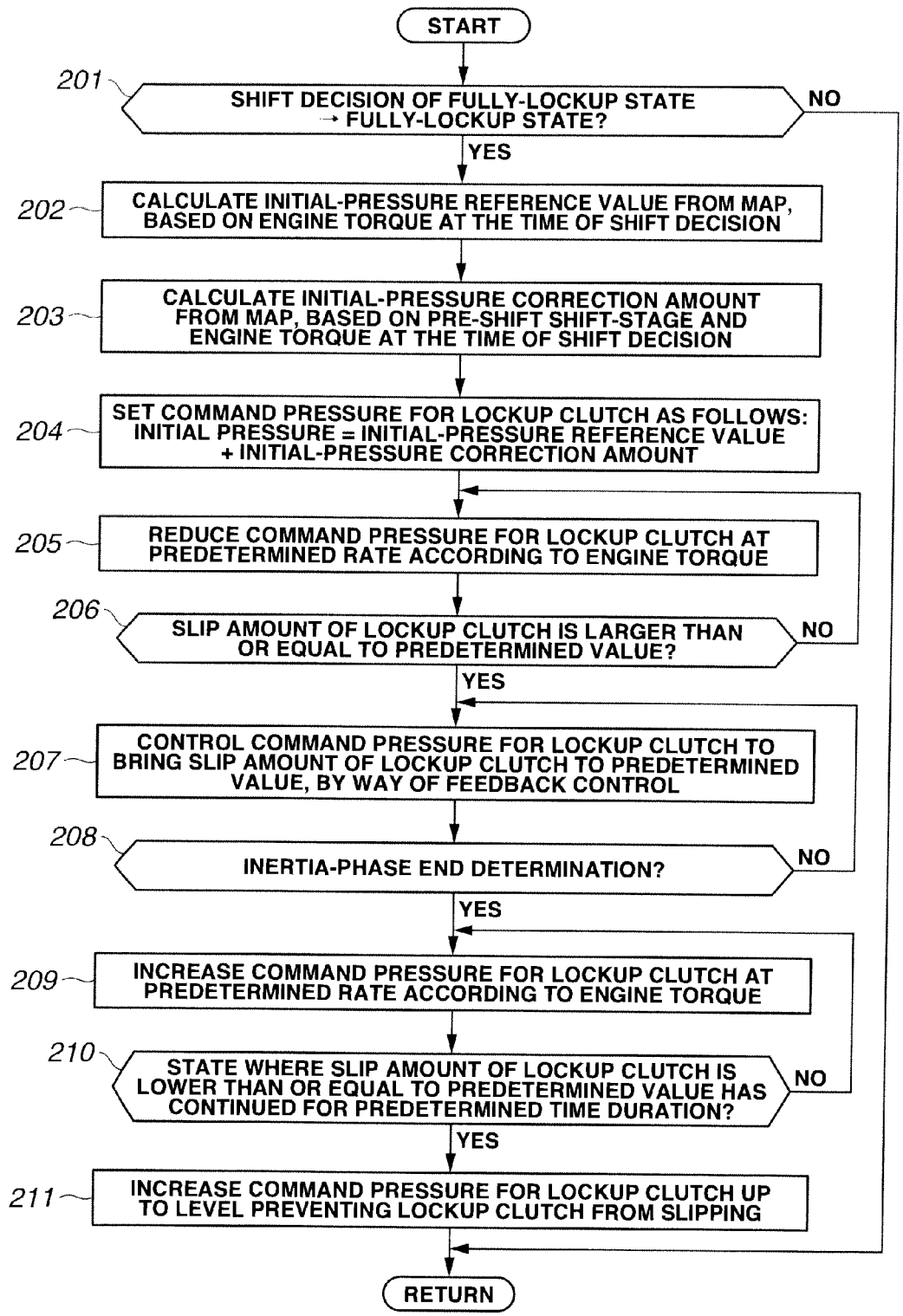
FIG. 2 is a flowchart showing a lockup control process during shift which is executed by a controller according to the first embodiment.

FIG. 2 is a flowchart showing the lockup control process during shift which is executed in the controller 100 according to the first embodiment. At step S201, the controller judges whether a shift command to perform the shift from a pre-shift shift-stage under fully-lockup state into a post-shift shift-stage under fully-lockup state is outputted or not. If NO at step S201, namely if the shift command to perform the shift from the pre-shift shift-stage under fully-lockup state to the post-shift shift-stage under fully-lockup state is not outputted; this control flow is terminated. If YES at step S201, namely if the shift command to perform the shift from the pre-shift shift-stage under fully-lockup state to the post-shift shift-stage under fully-lockup state is outputted; the program proceeds to step S202 because the controller determines that a control for the lockup clutch 24 is necessary. That is, at step S201, the controller judges whether or not an operating point (driving point) falls within a fully-lockup region after the shift, on the basis of a current engine rotational speed and a gear ratio of post-shift shift-stage (actual speed ratio value for the post-shift shift-stage). This operating point represents a point in a two-dimensional plane, which is defined by the vehicle speed and the accelerator-pedal opening. Various shift-stage regions are set in this two-dimensional plane, and also, the fully-lockup region, a slipping-lockup region and a lockup-clutch releasing region are set in the two-dimensional plane. By using this two-dimensional plane, a shift map is constructed.

In the first embodiment, the shift from the pre-shift shift-stage maintaining the fully-lockup state to the post-shift shift-stage maintaining the fully-lockup state will be explained below. However, the first embodiment according to the present invention is applicable to the other types of shifts. For example, in a case that a shift from the pre-shift shift-stage maintaining the fully-lockup state to the post-shift shift-stage maintaining the slipping-lockup state is performed; a steady-state slip control is carried out to bring the slip amount of lockup clutch close to a predetermined slip amount by way of feedback control after the end of inertia phase, and meanwhile, the calculation for a correction amount of the initial pressure is conducted in the same manner as the shift from the fully-lockup state to the fully-lockup state.

At step S202, the controller calculates or selects an initial-pressure reference value from an initial-pressure map, on the basis of a value of engine torque at the time of shift decision. This initial-pressure map has been set in advance based on the engine torque without depending on the type of shift.

At step S203, the controller calculates or selects the stored initial-pressure correction amount from an initial-pressure correction-amount map shown in FIG. 5, on the basis of the shift-stage acting at the start time of shift and a value of engine torque indicated at the time of shift decision. Details about a process of calculating the initial-pressure correction amount will be described later.

At step S204, the controller sets a command pressure for the lockup clutch 24 as the following formula ①.

$$\text{Initial pressure}=\text{Initial-pressure reference value}+\text{Initial-pressure correction amount} \qquad \text{①}$$

It is noted that step S204 (controller 100) corresponds to an initial-pressure control section or means according to the present invention. This initial-pressure reference value has been set in advance based on the engine torque without depending on the type of shift. A target initial slip amount is achieved by this initial pressure. The target initial slip amount is set as a slip amount (slip degree) which does not give a strangeness feeling to the driver due to the engine-idling feeling at the start timing of inertia phase. That is, the target initial slip amount is set at a level preventing the engine-idling feeling from becoming an uncomfortable feeling of driver at the start timing of inertia phase. Hence, the initial pressure needs to be set so as to attain this target initial slip amount. That is, in order to attain the target initial slip amount, the after-mentioned initial-pressure correction control process is carried out.

At step S205, the controller reduces the command pressure for the lockup clutch 24 at a predetermined rate according to the engine torque.

At step S206, the controller judges whether or not the slip amount of lockup clutch 24 is larger than or equal to a feedback-start (F/B-start) predetermined value. If YES at step S206, namely if the slip amount of lockup clutch 24 is larger than or equal to the F/B-start predetermined value; the program proceeds to step S207. If NO at step S206, namely if the slip amount of lockup clutch 24 is smaller than the F/B-start predetermined value; the program returns to step S205, and then, the command pressure for lockup clutch 24 continues to be reduced.

At step S207, the command pressure for lockup clutch 24 is controlled to bring the slip amount of lockup clutch 24 closer to the F/B-start predetermined value, by way of feedback control. This F/B-start predetermined value is set at a value larger than the target initial slip amount (which should be achieved after the correction by an after-mentioned initial-pressure correction-amount calculating process). Thereby, a problem can be avoided that the feedback control starts before the initial-pressure correction-amount calculating process starts to function.

At step S208, the controller judges whether or not the inertia phase has ended. If YES at step S208, namely if the controller determines that the inertia phase has ended; the program proceeds to step S209. If NO at S208, namely, if the controller determines that the inertia phase has not yet ended; the program returns to step S207, and the feedback control of lockup-clutch pressure is continued. At step S208, the controller judges whether or not the inertia phase has ended by judging whether or not a current actual gear ratio has become equal to a level obtained by adding a certain value α to the gear ratio value of post-shift shift-stage (gear ratio value of post-shift gear stage+α).

At step S209, the controller increases the command pressure for lockup clutch 24 by a predetermined rate according to the engine torque.

At step S210, the controller judges whether or not a state where the slip amount of lockup clutch 24 is lower than or equal to a predetermined value has continued for a predetermined time duration. If NO at step S210, namely if the state where the slip amount of lockup clutch 24 is lower than or equal to the predetermined value has not yet continued for the predetermined time duration; the program returns to step S209, and the increase of lockup-clutch command pressure is continued. If YES at step S210, namely if the state where the slip amount of lockup clutch 24 is lower than or equal to the predetermined value has already continued for the predetermined time duration; the program proceeds to step 211.

At step S211, the controller increases the command pressure for lockup clutch 24 up to a level that prevents the lockup clutch 24 from slipping.

(Initial-Pressure Learning-Correction Control Process)

Figure 3:
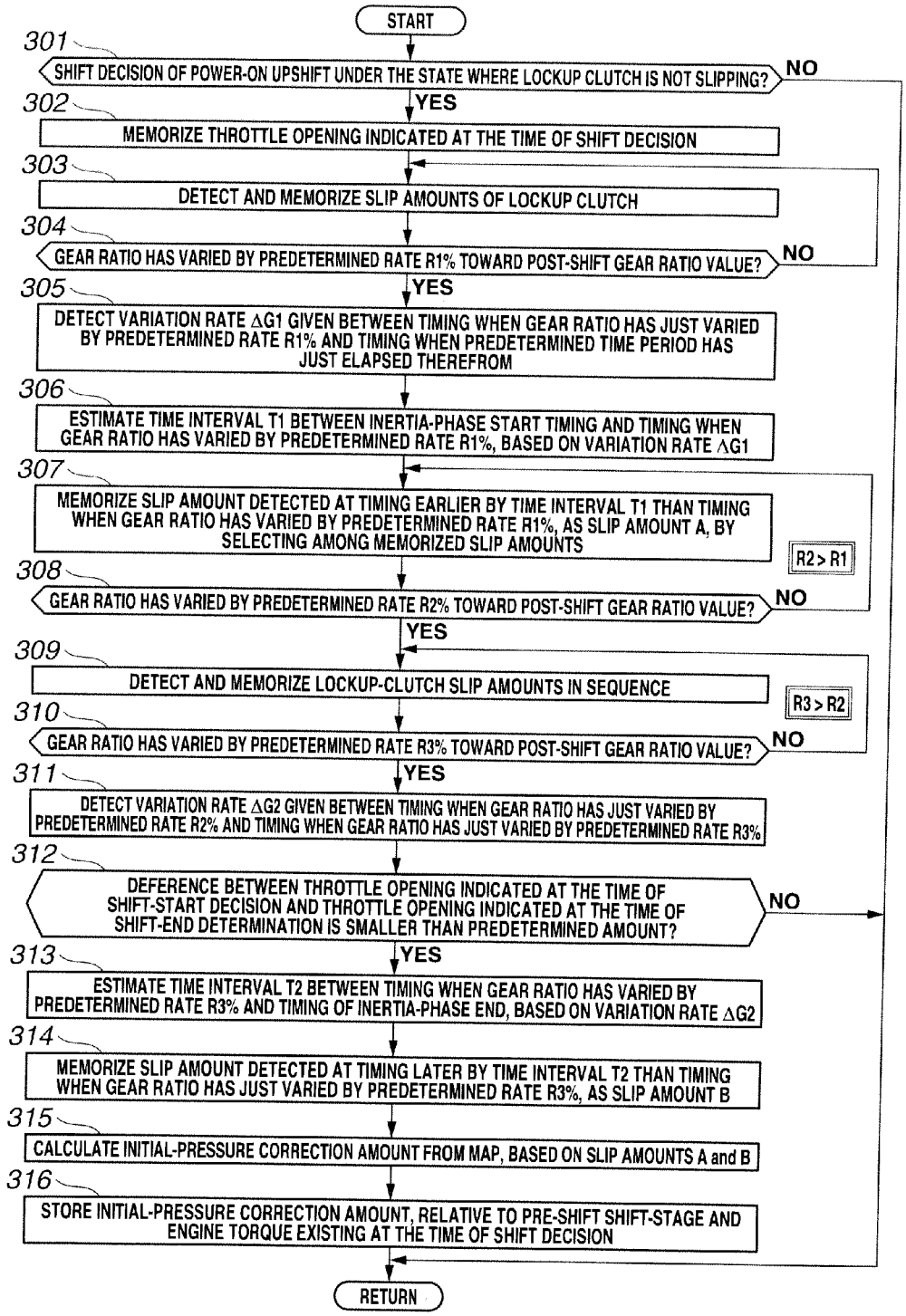
FIG. 3 is a flowchart showing an initial-pressure learning-correction control process which is executed by the controller according to the first embodiment.

FIG. 3 is a flowchart showing the initial-pressure (learning-) correction control process that is executed in the controller 100 according to the first embodiment. In this flow, a power-on upshift will be explained. However, the flow as FIG. 3 may be executed at the case of a shift other than the power-on upshift. Moreover, in this embodiment, the initial-pressure learning-correction control is meant by a control for appropriately correcting the initial pressure which is set at the time of next-time shift (next-time identical type of shift) in order to achieve a desired slip-amount characteristic for shift. It is noted that the initial-pressure learning-correction control (flowchart of FIG. 3) corresponds to a learning section or means according to the present invention.

At step S301, the controller judges whether or not a shift determination of power-on upshift has been conducted (outputted) under a state where it can be determined that the lockup clutch 24 is not slipping. If YES at step S301, namely the controller decides the power-on upshift under the state where the lockup clutch 24 is not slipping; the program proceeds to step S302. If NO at step S301, this control flow is terminated. Specifically, at step S301, the judgment about no slipping of lockup clutch 24 is conducted by judging whether or not a current differential pressure of lockup clutch is larger by a predetermined rate than the initial (differential) pressure which should be set at the start time of shift. As another method for the judgment about no slipping of lockup clutch 24, it may be judged whether or not the shift is started under a state where the operating point is located within the fully-lockup region.

At step S302, the controller memorizes or stores a value of throttle opening indicated at the time of shift determination.

At step S303, the controller continues to detect values of lockup-clutch slip amount and to continues to memorize these detected values with time lapse reaching a current timing. It is noted that this processing of step S302 corresponds to a memorizing section or means according to the present invention. A timing of the processing of step S302 corresponds to a timing when the command pressure for lockup clutch 24 continues to be reduced at steps S204 to S206 of FIG. 2. That is, at step S302, the controller detects the values of lockup-clutch slip amount which are produced when the command pressure for lockup clutch 24 continues to be reduced at steps S204 to S206 of FIG. 2. A time period (duration time) for which these values of lockup-clutch slip amount continue to be memorized is determined as follows. A "maximum value of time period (maximum of necessary duration time)" between the time point of inertia-phase actual start and a time point when the gear ratio has just varied by a predetermined rate R1% is calculated in advance by experiments or the like. Thereby, the time period for which the controller continues to memorize the values of lockup-clutch slip amount is set at a value obtained by adding a certain value α to this "maximum value" ("maximum value"+α). Hence, at step S302, the controller is sequentially memorizing the data of slip amounts from a time point earlier by the obtained value ("maximum value"+α) to the current timing. This memorizing processing of step S303 continues until the time point when the gear ratio has just varied by the predetermined rate R1%.

At step S304, the controller judges whether or not the gear ratio has varied by the predetermined rate R1% toward the gear ratio value of post-shift shift-stage. If YES at step S304, namely if the gear ratio has varied by the predetermined rate R1%; the program proceeds to step S305. If NO at step S304, namely if the gear ratio has not yet varied by the predetermined rate R1%; the program returns to step S303. It is noted that the processing of step S304 corresponds to a variation-start detecting section or means according to the present invention.

At step S305, the controller detects a variation rate ΔG1 of gear ratio which is given between the timing when the gear ratio has just varied by the predetermined rate R1% and a timing when a predetermined time period has just elapsed from the timing of R1%. It is noted that the processing of step S305 corresponds to a variation-rate detecting section or means according to the present invention. This predetermined time period is appropriately set in advance in this example according to the first embodiment. However, according to this embodiment, the controller may detect a variation rate ΔG1 of gear ratio which is given between the timing when the gear ratio has just varied by the predetermined rate R1% and a timing when the gear ratio has just varied by a predetermined rate R4%.

At step S306, the controller estimates a time interval T1 between the time point of inertia-phase start and the time point when the gear ratio has just varied by the predetermined rate R1%, on the basis of the detected variation rate ΔG1 of gear ratio. That is, the controller estimates the actual start timing of inertia phase (i.e., a time point when the gear ratio has just varied by 0%) on the assumption that the gear ratio has varied by the predetermined rate R1% at a gradient equal to ΔG1. In other words, this time interval T1 is set to be shorter, as an absolute value of variation rate ΔG1 of the parameter (gear ratio) which varies during the inertia phase becomes greater.

At step S307, the controller memorizes or stores a slip-amount value indicated at a timing earlier by the time interval T1 than the time point when the gear ratio has just varied by the predetermined rate R1%, as a slip amount A, by selecting among the memorized slip-amount values of lockup clutch 24. Thereby, at step S307, the slip-amount value caused at the start time of inertia phase is stored as the slip amount A. It is desirable that this slip amount A is equal to the target initial slip amount. Hence, the after-mentioned initial-pressure correction amount is calculated so as to bring the slip amount A to the target initial slip amount. This target initial slip amount is set in advance to a level (slip degree) which does not give a strangeness feeling to the driver due to the engine-idling feeling at the start timing of inertia phase.

At step S308, the controller judges whether or not the gear ratio has varied by a predetermined rate R2% toward the gear ratio value of post-shift shift-stage. If YES at step S308, namely if the gear ratio has varied by the predetermined rate R2%; the program proceeds to step S309. If NO at step S308, namely if the gear ratio has not yet varied by the predetermined rate R2%; the processing of step S308 is repeated until the gear ratio has varied by the predetermined rate R2%.

At step S309, the controller continues to detect values of lockup-clutch slip amount and to memorize these detected values, sequentially. It is noted that this processing of step S309 corresponds to the memorizing section or means according to the present invention.

At step S310, the controller judges whether or not the gear ratio has varied by the predetermined rate R3% toward the gear ratio value of post-shift shift-stage. If YES at step S310, namely if the gear ratio has varied by the predetermined rate R3%; the program proceeds to step S311. If NO at step S310, namely if the gear ratio has not yet varied by the predetermined rate R3%; the program returns to step S309. It is noted that the processing of step S310 corresponds to a variation-end detecting section or means according to the present invention. Thus, when the variation of parameter (i.e., detected gear ratio) has almost ended, it is determined that the shift (actual shifting action) has substantially ended. This is for the following reasons. That is, because the detected gear ratio includes a detection noise of sensor, a value of gear ratio detected at an actual end time of inertia phase does not always become completely equal to the gear ratio value of post-shift shift-stage. Hence, if trying to detect that the detected gear ratio has become completely equal to the gear ratio value of post-shift shift-stage, there is a possibility that the end of inertia phase cannot be determined.

At step S311, the controller detects a variation rate ΔG2 of gear ratio which is given between the time point when the gear ratio has just varied by the predetermined rate R2% and the time point when the gear ratio has just varied by the predetermined rate R3%. It is noted that the processing of step S311 corresponds to the variation-rate detecting section or means according to the present invention.

At step S312, the controller judges whether or not a difference between the throttle-opening value indicated at the time of detection of shift start and a throttle-opening value indicated at the time of detection of shift end is smaller than a predetermined amount. If YES at step S312, namely if the difference between the throttle-opening values is smaller than the predetermined amount; the program proceeds to step S313. If NO at step S312, namely if the difference between the throttle-opening values is larger than or equal to the predetermined amount; this control flow is terminated. It is noted that the processing of step S312 corresponds to a prohibiting section or means according to the present invention. In a case that the throttle opening greatly varies, namely in a case that "a variation amount of driving force is larger than or equal to a predetermined amount"; there is a possibility that the slip amount is dispersed due to a variation of engine torque during the shift so that the setting of the initial pressure is adversely affected. Therefore, in such a case, by prohibiting the correction for the initial pressure, an error leaning is avoided in this embodiment.

At step S313, the controller estimates a time interval T2 between the timing when the gear ratio has just varied by the predetermined rate R3% and the actual end timing of inertia phase, on the basis of the detected variation rate ΔG2 of gear ratio. In other words, this time interval T2 is set to be shorter, as an absolute value of variation rate ΔG2 of the parameter (gear ratio) which varies during the inertia phase becomes greater.

At step S314, the controller stores a slip-amount value detected at a timing later by the time interval T2 than the time point when the gear ratio had just varied by the predetermined rate R3%, as a slip amount B. Thereby, at step S314, the slip-amount value caused at the end time of inertia phase is stored as the slip amount B. It is desirable that this slip amount B is equal to a target latter slip amount. Hence, the after-mentioned initial-pressure correction amount is calculated so as to bring the slip amount B to the target latter slip amount. This target latter slip amount is set in advance to a level (slip degree) which causes the shift shock to become acceptable to the driver at the end timing of inertia phase.

At step S315, the controller calculates the initial-pressure correction amount from a map, on the basis of the slip amounts A and B. FIG. 4 is an initial-pressure correction-amount calculation map according to the first embodiment. FIG. 5 is an initial-pressure correction-amount map according to the first embodiment. In the initial-pressure correction-amount calculation map, a predetermined correction-amount data has been recorded in advance. The correction amount Cmm is selected from the initial-pressure correction-amount calculation map, on the basis of the stored slip amounts A and B. A data value a1 of slip amount A is smaller than a data value am of slip amount A located lower than the data value a1 in the initial-pressure correction-amount calculation map. In the same manner, a data value b1 of slip amount B is smaller than a data value bm of slip amount B located on the right side of data value b1 in the initial-pressure correction-amount calculation map. Moreover, in the same manner, relations of C11<C1m, C11<Cm1, C1m<Cmm and Cm1<Cmm are satisfied in the initial-pressure correction-amount calculation map. Each of the data values Cxx takes a negative value, 0, or a positive value. The initial-pressure correction-amount calculation map is preset such that the value of 0 is selected in the case that the correction of initial pressure is unnecessary.

At step S316, the controller stores the calculated initial-pressure correction amount, relative to the pre-shift shift-stage (i.e., gear stage at the time of shift decision) and the engine torque indicated at the time of shift decision. That is, the correction amount Cxx selected at step S315 is newly written on the initial-pressure correction-amount map of FIG. 5. For example, in the case that the upshift from a second-speed to a third-speed has been performed while indicating the engine torque equal to TE2 at the time of shift decision, the selected correction amount Cxx is written within a space which is located in an upper row and which corresponds to TE2 in FIG. 5.

(Operation of Lockup Control Process During Shift)

Figure 6:
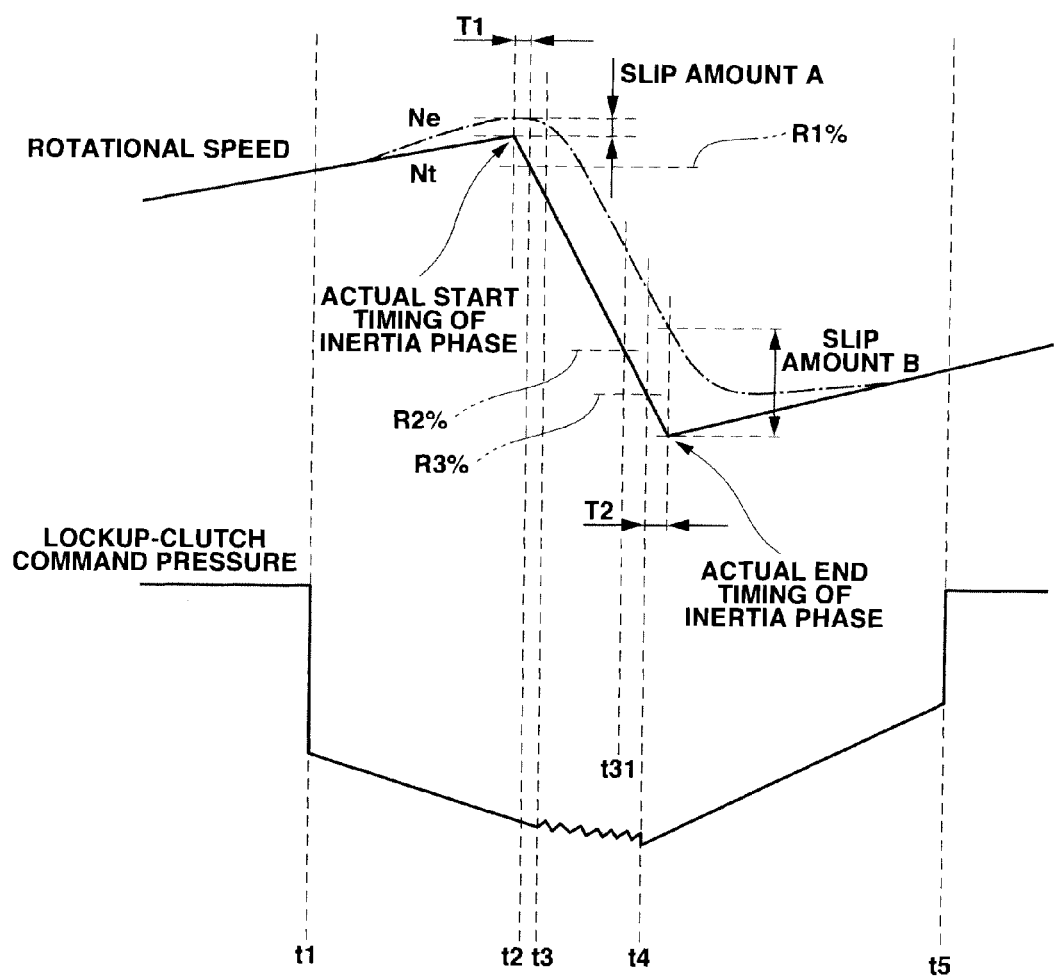
FIG. 6 is a time chart showing the lockup control process at the time of power-on upshift according to the first embodiment.

FIG. 6 is a time chart showing the lockup control process in the case of power-on upshift according to the first embodiment. As an initial condition, the lockup clutch 24 is in the fully-engaged state and the second-speed has been selected among the plurality of shift-stages (gear stages). At time point t1, an upshift command from the second-speed to the third-speed is outputted. At this time, the command pressure for lockup clutch 24 is reduced down to the initial pressure so that an engaging capacity minimum necessary to prevent the slip is attained. Then, the slip amount of lockup clutch 24 increases with the gradual reduction of command pressure for lockup clutch 24. Then, the slip amount is memorized repeatedly in sequence until the start of inertia phase is detected.

At time point t2, the gear ratio has just varied by the predetermined rate R1% after the inertia phase was actually started. At this time point t2, it is determined that the inertia phase has already started. Then, the variation rate $\Delta G1$ of gear ratio is detected. Thereby, the time point when the inertia phase was actually started is calculated, i.e., the time point when the gear ratio started to vary is calculated. The slip-amount value at this calculated time point is found from the memorized slip-amount values, and is stored as the slip amount A.

At time point t3, the slip amount has become larger than or equal to the F/B-start predetermined value. At this time, the feedback control is started by regarding the F/B-start predetermined value as a target value for this feedback control.

At time point t31, the actual gear ratio has just varied by the predetermined rate R2%. At this time, it is determined that the inertia phase has approached its end timing (i.e., it is determined that the current timing is close to the actual end timing of inertia phase), and hence, the slip amount of lockup clutch 24 starts to be memorized repeatedly in sequence.

At time point t4, the actual gear ratio has just varied by the predetermined rate R3%. At this time, it is determined that the inertia phase has extremely approached its end timing (i.e., it is determined that the current timing is extremely close to the actual end timing of inertia phase), and hence, the feedback control is finished. Then, the variation rate $\Delta G2$ of gear ratio is detected which is given between the time point when the gear ratio has just varied by the predetermined rate R2% and the time point when the gear ratio has just varied by the predetermined rate R3%. The time interval T2 is calculated which is a time length between the time point t4 and the time point when the inertia phase is actually ended, i.e., between the time point t4 and the timing when the variation of gear ratio ends. Then, the slip-amount value at the time of actual end of inertia phase is stored as the slip amount B.

At time point t5, it is determined that the state where the slip amount is lower than or equal to the predetermined value has continued for the predetermined time duration, and hence, the lockup clutch 24 is made to become in the fully-engaged state.

While the lockup control process is performed during the shift as mentioned above, the initial-pressure correction control process is performed. In a case where the slip amount A which was memorized between the time point t1 and the time point t2 is large, the actual initial slip amount is larger than the target initial slip amount. Therefore, basically in this case, the initial pressure needs to be set more highly. On the other hand, in a case where the slip amount A is small, the actual initial slip amount is near the target initial slip amount. Therefore, basically in this case, the initial pressure needs to be set relatively low. Next, in a case where the slip amount B which was memorized between the time point t3 and the time point t4 is small; the actual latter slip amount is smaller than the target latter slip amount, or the actual latter slip amount is near the target latter slip amount. Therefore, in this case, the initial pressure does not need to be much increased. On the other hand, in a case where the slip amount B is large, the actual latter slip amount is larger than the target latter slip amount. Therefore, in this case, the initial pressure needs to be further increased. In consideration of magnitude relations of these slip amounts A and B, an appropriate value of initial-pressure correction amount is selected from the initial-pressure correction-amount calculation map. Thereby, the appropriate initial-pressure correction amount is set in the next lockup control process for shift, so that the slip amount A is obtained at a small degree and the slip amount B is obtained at its appropriate degree in the next lockup control process. Therefore, the shift shock can be reduced.

As explained above, the following listed advantageous effects can be obtained according to the first embodiment of the present invention.

(1) In the control apparatus for vehicle which includes the automatic transmission 3 configured to attain a predetermined shift-stage by releasing an engaged friction-engagement element and by engaging a released friction-engagement element, there are provided the step S304 (variation-start detecting section) configured to detect that the parameter which varies with the progress of inertia phase has varied; the steps S303 and S309 (memorizing section) configured to sequentially memorize the state of the vehicle; and the initial-pressure learning-correction control (learning section) functioning to correct the control quantity for next-time shift on the basis of the state of vehicle memorized at a timing earlier by the given time interval T1 than the timing t2 when it was detected that the parameter had varied at step S304.

Accordingly, the control quantity for the next-time execution of shift is corrected based on the vehicle state which is indicated at a time point preceding, by the given time interval, the time point when it is detected that the parameter which varies together with the progress of inertia phase has varied. Hence, the control quantity for next-time execution of shift can be corrected based on the vehicle state existing at a timing much closer to the actual start timing of inertia phase, so that the accuracy of learning control can be enhanced.

(2) The control apparatus for vehicle further includes the steps S305 and S311 (variation-rate detecting section) configured to detect the variation rate of the parameter varying with the progress of inertia phase. Moreover, the initial-pressure learning-correction control (learning section) sets the given time interval T1 to become shorter as the absolute value of variation rate of parameter becomes larger.

Accordingly, the given time interval T1 is set based on the variation rate of the gear ratio that has a property of varying with the progress of inertia phase. That is, the time interval (=T1) necessary for the gear ratio to vary by the predetermined rate from the actual start timing of inertia phase can be estimated by a back-calculation using the variation rate $\Delta G1$ of gear ratio. Therefore, the lockup-clutch initial pressure for the next-time execution of shift can be corrected by using the data of lockup-clutch slip amount existing at a timing much closer to the actual start timing of inertia phase, so that the accuracy of learning control can be more enhanced.

Moreover, the variation of the parameter that has the property of varying with the progress of inertia phase basically depends on a control for clutches that are changed to each other during the shift. Intrinsically, for example, these clutches are controlled so as not to rapidly change the gear ratio during the inertia phase. Hence, a variation-rate value of gear ratio between the actual start timing of inertia phase and the timing t2 when the gear ratio has just varied by the predetermined rate R1% is approximately equal to the variation-rate value of gear ratio between the timing t2 when the gear ratio has just varied by the predetermined rate R1% and the timing when the predetermined time duration has just elapsed from the timing t2. That is, in the technique in which the time interval T1 is set based on the variation rate of the parameter which has the property of varying with the progress of inertia phase, the data of lockup-clutch slip amount which exists at a timing much closer to the actual start timing of inertia phase can be used.

(3) The control apparatus for vehicle further includes the lockup clutch 24 provided in the torque converter 2 interposed between the automatic transmission 3 and the engine (drive source) 1 of the vehicle. This lockup clutch 24 is configured to engage input and output elements of the torque converter 2 with each other. Moreover, the control apparatus further includes the controller 100 (lockup-clutch control section) configured to control the hydraulic pressure of lockup clutch 24; and the step S204 (initial-pressure control section) configured to control the hydraulic pressure of lockup clutch 24 to be the predetermined initial pressure when the shift of automatic transmission 3 is started. Moreover, the step S303 (memorizing section) is configured to sequentially memorize the slip amount of lockup clutch 24 until it is detected that the parameter has varied at step S304. The initial-pressure learning-correction control (learning section) corrects the predetermined initial pressure for the next-time shift in such a manner that the slip amount of lockup clutch 24 memorized at the timing earlier by the given time interval T1 than the timing t2 when it was detected that the parameter had varied at step S304 (variation-start detecting section) is brought to the predetermined target initial slip amount.

That is, the initial pressure for the next-time shift can be appropriately corrected so as to cause the initial slip amount existing at the start timing of inertia phase to become equal to the predetermined target initial slip amount. Even if the initial slip amount indicated at the determination timing of inertia-phase start has already become greater than the slip amount existing at the actual start timing of inertia phase due to a large shift speed, an appropriate initial pressure can be obtained without simply increasing the initial pressure for correction. Therefore, the learning accuracy of initial pressure can be improved.

(4) The control apparatus for vehicle further includes the step S310 (variation-end detecting section) configured to detect that the variation of parameter has almost ended. The initial-pressure learning-correction control (learning section) corrects the control quantity for the next-time shift in such a manner that the slip amount of lockup clutch 24 memorized at the timing earlier by the given time interval T1 than the timing t2 when the operation of step S304 (variation-start detecting section) detected that the parameter had varied is brought to the predetermined target initial slip amount, and in such a manner that the slip amount of lockup clutch 24 memorized at a timing later by the second given time interval T2 than the timing t4 when the operation of step S310 (variation-end detecting section) detected that the variation of parameter had almost ended is brought to the predetermined target latter slip amount.

Even in a case that the slip amount existing at the start timing of inertia phase is a degree capable of preventing the engine-idling feeling from giving uncomfortable feeling to the driver, if the initial pressure is larger than its appropriate level, there is a risk that the slip amount existing at the end timing of inertia phase becomes excessively small so that the shift shock is increased. Hence, in this embodiment, the initial pressure is corrected so as to bring a maximum slip amount existing at the end timing of inertia phase to a slip-amount level that produces an acceptable shift shock. Accordingly, the shift shock occurring at the end time of inertia phase can be suppressed. Moreover, the initial pressure of lockup clutch for next-time shift can be corrected based on the slip amount of lockup clutch indicated at a timing much closer to the actual end timing of inertia phase, in the same manner as the start timing of inertia phase. Therefore, the accuracy of the learning control can be more improved.

(5) The control apparatus further includes the step S312 (prohibiting section) configured to prohibit the initial-pressure learning-correction control (learning section) from correcting the predetermined initial pressure when the variation amount of throttle opening (driving force of the drive source) during the shift is larger than or equal to the predetermined amount.

For example, in a case that the accelerator has been greatly depressed during a time interval between the output timing of shift-start command and the start timing of inertia phase, it cannot be judged whether the slip amount has increased due to the shortage of initial pressure or due to the increase of engine torque. Hence, in such a case, there is a risk that the initial pressure is improperly corrected. Therefore, in this embodiment according to the present invention, the correction of initial pressure is prohibited (suspended) when the variation amount of driving force of drive source during the shift is great. Accordingly, an improper correction of initial pressure can be prevented.

Hereinbefore, the first embodiment according to the present invention has been explained. However, the present invention is not limited to the embodiment described above. Modifications and variations of the embodiment described above will occur to those skilled in the art in light of the above teachings.

For example, in the first embodiment, when the gear ratio has varied by the predetermined rate R1% from the gear ratio value for pre-shift shift-stage toward the gear ratio value for post-shift shift-stage, it is determined that the inertia phase has started. However, the structure of the present invention is not limited to this structure. For example, it may be determined that the inertia phase has started, when the turbine rotational speed has just varied by a predetermined amount instead of the gear ratio. That is, the start (execution) of inertia phase only has to be determined by detecting that a parameter having the characteristic of varying with the progress of inertia phase has varied.

In the first embodiment, the predetermined time interval T1 is calculated based on the variation rate $\Delta G1$ of gear ratio. However, the structure of the present invention is not limited to this structure. For example, the predetermined time interval T1 may be calculated based on the variation rate of turbine rotational speed. That is, a parameter whose variation timing is detected by the variation-start detecting section does not need to be identical with a parameter whose variation rate is detected by the variation-rate detecting section.

In the first embodiment, the variation rate $\Delta G1$ of gear ratio between the time point when the gear ratio has just varied by the predetermined rate R1% and the time point when the predetermined time duration has just elapsed therefrom is calculated. However, the structure of the present invention is not limited to this structure. For example, each value of variation rate of gear ratio for a predetermined time duration may be memorized and updated repeatedly until the gear ratio has just varied by the predetermined rate R1%. That is, the variation rate of gear ratio indicated before the gear ratio has just varied by the predetermined rate R1% may be calculated. In other words, a value of variation rate of gear ratio for some time period which can be regarded as approximately equal to the variation-rate value of gear ratio existing when the gear ratio has just varied by the predetermined rate R1% only has to be used according to the present invention. However, in the case that the variation rate of gear ratio is calculated which is given before the gear ratio has just varied by the predetermined rate, values of variation rate of gear ratio need to be memorized and updated until it is detected that the gear ratio has varied by the predetermined rate. Hence, in such a case, a data amount becomes great. Therefore, in the first embodiment, the variation rate of gear ratio is calculated which is given between the time point t2 when the gear ratio has just varied by the predetermined rate and the time point when the predetermined time duration has just elapsed from the time point t2.

In the first embodiment, it is determined that the inertia phase has almost ended when the gear ratio has just varied by the predetermined rate R3% from the gear ratio value of pre-shift shift-stage toward the gear ratio value of post-shift shift-stage. However, the structure of the present invention is not limited to this. For example, it may be determined that the inertia phase has almost ended when the turbine rotational speed has just varied by a predetermined amount instead of the gear ratio. That is, any parameter, e.g. the parameter which varies with the progress of inertia phase, that can be used for determining that the inertia phase has substantially ended may be used according to the present invention.

In the first embodiment, the time interval T2 is set based on the variation rate ΔG2 of gear ratio given between the time point when the gear ratio has just varied by the predetermined rate R2% from the gear ratio value of pre-shift shift-stage toward the gear ratio value of post-shift shift-stage and the time point when the gear ratio has just varied by the predetermined rate R3% from the gear ratio value of pre-shift shift-stage toward the gear ratio value of post-shift shift-stage. However, the structure of the present invention is not limited to this. A value of variation rate of gear ratio for some time period which can be regarded as approximately equal to the variation rate of gear ratio existing when the gear ratio has just varied by the predetermined rate R3% only has to be used according to the present invention. For example, the time interval T2 may be set based on a variation-rate value of gear ratio indicated after the gear ratio has varied by the predetermined rate R3% from the gear ratio value of pre-shift shift-stage. Moreover, the time interval T2 may be a constant value, and may be set based on the turbine rotational speed. Moreover, according to the present invention, by regarding the variation rate ΔG2 of gear ratio as approximately equal to the already-calculated variation rate ΔG1 of gear ratio, the time interval T2 may be set based on the variation rate ΔG1 of gear ratio without calculating the variation rate ΔG2.

In the first embodiment, the correction amount for the initial pressure of lockup clutch is calculated when the upshift of automatic transmission is performed. However, the structure of the present invention is not limited to this. For example, the correction amount for the initial pressure of lockup clutch may be calculated when a downshift of automatic transmission is performed.

This application is based on a prior Japanese Patent Application No. 2010-058647 filed on Mar. 16, 2010. The entire contents of this Japanese Patent Application are hereby incorporated by reference.

The scope of the invention is defined with reference to the following claims.

What is claimed is:

1. A control apparatus for a vehicle, comprising:
an automatic transmission configured to attain a predetermined shift-stage by releasing an engaged friction-engagement element and by engaging a released friction-engagement element;
a variation-start detecting section configured to detect that a parameter which varies with a progress of an inertia phase has started to vary in accordance with a variation rate of a turbine rotational speed;
a memorizing section configured to sequentially memorize a slip amount until the variation-start detecting section detects that the parameter has started to vary; and
a learning section configured to:
correct a control quantity for a next-time shift of the automatic transmission, based on the slip amount memorized at a start timing of the inertia phase, and
recognize the start timing of the inertia phase as being at a time that is earlier by a given time interval than a time when the variation-start detecting section detects that the parameter has started to vary.

2. The control apparatus as claimed in claim 1, wherein
the control apparatus further comprises a variation-rate detecting section configured to detect a variation rate of the parameter varying with the progress of the inertia phase, and
the learning section is configured to set the given time interval to become shorter as an absolute value of the variation rate of the parameter becomes larger.

3. The control apparatus as claimed in claim 1, wherein the control apparatus further comprises:
a lockup clutch provided in a torque converter interposed between the automatic transmission and a drive source of the vehicle, the lockup clutch being configured to engage input and output elements of the torque converter with each other;
a lockup-clutch control section configured to control a hydraulic pressure of the lockup clutch; and
an initial-pressure control section configured to control the hydraulic pressure of the lockup clutch to be a predetermined initial pressure when a shift of the automatic transmission is started,
wherein the slip amount that the memorizing section is configured to sequentially memorize is a slip amount of the lockup clutch that is memorized until the variation-start detecting section detects that the parameter has started to vary, and
wherein the learning section is configured to correct the predetermined initial pressure for the next-time shift such that the slip amount of the lockup clutch memorized at the time that is earlier by the given time interval than the time when the variation-start detecting section detected that the parameter had started to vary is brought close to a predetermined target initial slip amount.

4. The control apparatus as claimed in claim 3, wherein
the control apparatus further comprises a variation-end detecting section configured to detect that the variation of the parameter has almost ended,
the learning section is configured to correct the control quantity for the next-time shift such that the slip amount of the lockup clutch memorized at the time that is earlier by the given time interval than the time when the variation-start detecting section detected that the parameter had started to vary is brought close to the predetermined target initial slip amount, and such that the slip amount of the lockup clutch memorized at a time later by a second given time interval than a time when the variation-end detecting section detected that the variation of the parameter had almost ended is brought close to a predetermined target latter slip amount.

5. The control apparatus as claimed in claim 3, wherein the control apparatus further comprises a prohibiting section configured to prohibit the learning section from correcting the predetermined initial pressure when a variation amount of driving force of the drive source during the shift is larger than or equal to a predetermined amount.

6. A control apparatus for a vehicle, comprising:
an automatic transmission configured to attain a predetermined shift-stage by releasing an engaged friction-engagement element and by engaging a released friction-engagement element;
variation-start detecting means for detecting that a parameter which varies with a progress of an inertia phase has started to vary in accordance with a variation rate of a turbine rotational speed;
memorizing means for sequentially memorizing a slip amount until the variation-start detecting means detects that the parameter has started to vary; and
learning means for correcting a control quantity for a next-time shift of the automatic transmission, based on the slip amount memorized at a start timing of the inertia phase, and
means for recognizing the start timing of the inertia phase as being at a time that is earlier by a given time interval than a time when the variation-start detecting means detects that the parameter has started to vary.

7. A control method for a vehicle including a controller and an automatic transmission configured to attain a predetermined shift-stage by releasing an engaged friction-engagement element and by engaging a released friction-engagement element, the control method comprising:
detecting that a parameter which varies with a progress of an inertia phase has started to vary in accordance with a variation rate of a turbine rotational speed;
sequentially memorizing a slip amount until detection is made that the parameter has started to vary;
recognizing a start timing of the inertia phase as being at a time that is earlier by a given time interval than a time when it is detected that the parameter has started to vary; and
correcting, by the controller, a control quantity for a next-time shift of the automatic transmission, based on the slip amount memorized at the start timing of the inertia phase.

* * * * *